United States Patent
Alankry et al.

(10) Patent No.: US 7,886,090 B2
(45) Date of Patent: Feb. 8, 2011

(54) METHOD FOR MANAGING UNDER-RUNS AND A DEVICE HAVING UNDER-RUN MANAGEMENT CAPABILITIES

(75) Inventors: Yaron Alankry, Ra'Anana (IL); Eran Glickman, Reshon Letzion (IL); Erez Parnes, Petah-Tikva (IL)

(73) Assignee: Freescale Semiconductor, Inc., Austin, TX (US)

( * ) Notice: Subject to any disclaimer, the term of this patent is extended or adjusted under 35 U.S.C. 154(b) by 258 days.

(21) Appl. No.: 12/160,006

(22) PCT Filed: Jan. 4, 2006

(86) PCT No.: PCT/IB2006/050030

§ 371 (c)(1),
(2), (4) Date: Jul. 3, 2008

(87) PCT Pub. No.: WO2007/077496

PCT Pub. Date: Jul. 12, 2007

(65) Prior Publication Data

US 2008/0307127 A1    Dec. 11, 2008

(51) Int. Cl.
*G06F 3/00*    (2006.01)
(52) U.S. Cl. .............................. 710/53; 710/22; 710/52; 710/56; 710/57; 709/232; 709/233; 709/234; 714/9; 714/48; 714/100
(58) Field of Classification Search ............... 710/53
See application file for complete search history.

(56) References Cited

U.S. PATENT DOCUMENTS

| | | | | |
|---|---|---|---|---|
| 4,692,894 A * | 9/1987 | Bemis | ........................ | 710/57 |
| 4,942,553 A | 7/1990 | Dalrymple et al. | ............ | 710/57 |
| 5,068,676 A * | 11/1991 | Yoshida et al. | ............... | 347/247 |
| 5,732,094 A * | 3/1998 | Petersen et al. | ............. | 714/805 |
| 5,765,187 A * | 6/1998 | Shimizu et al. | ............. | 711/110 |
| 5,822,522 A * | 10/1998 | Kazama | ...................... | 709/233 |
| 5,845,152 A * | 12/1998 | Anderson et al. | ............. | 710/52 |
| 6,088,412 A * | 7/2000 | Ott | .............................. | 375/372 |
| 6,137,804 A | 10/2000 | Allison et al. | ............... | 370/410 |
| 6,429,902 B1 * | 8/2002 | Har-Chen et al. | ........... | 348/518 |
| 6,442,646 B1 * | 8/2002 | Tsuruta | ...................... | 711/109 |
| 6,631,429 B2 * | 10/2003 | Cota-Robles et al. | ........ | 710/52 |
| 6,813,275 B1 * | 11/2004 | Sharma et al. | .............. | 370/412 |

(Continued)

FOREIGN PATENT DOCUMENTS

EP    0989483 B1    8/2007

(Continued)

*Primary Examiner*—Henry W Tsai
*Assistant Examiner*—Steven G Snyder

(57) ABSTRACT

A method for managing under-runs and a device having under-run management capabilities. The method includes retrieving packets from multiple buffers, monitoring a state of a multiple buffers, determining whether an under-run associated with a transmission attempt of a certain information frame from a certain buffer occurs; if an under-run occurs, requesting a certain information frame transmitter to transmit predefined packets while ignoring packets that are retrieved from the certain buffer, until a last packet of the information frame is retrieved from the certain buffer; and notifying a processor that an under-run occurred after at least one predefined packet was transmitted; wherein each buffer out of the multiple buffers is adapted to store a fraction of a maximal sized information frame.

18 Claims, 8 Drawing Sheets

U.S. PATENT DOCUMENTS

| | | | |
|---|---|---|---|
| 6,952,739 B2 * | 10/2005 | Fritz et al. | 709/232 |
| 6,959,015 B1 * | 10/2005 | Hwang et al. | 370/516 |
| 7,003,059 B1 * | 2/2006 | Susnow et al. | 375/351 |
| 7,076,578 B2 * | 7/2006 | Poisner et al. | 710/52 |
| 7,320,037 B1 * | 1/2008 | Maturi et al. | 709/236 |
| 7,546,392 B2 * | 6/2009 | Castille et al. | 710/22 |
| 7,773,504 B2 * | 8/2010 | Chew et al. | 370/229 |
| 2002/0016850 A1 * | 2/2002 | Fritz et al. | 709/232 |
| 2002/0031126 A1 * | 3/2002 | Crichton et al. | 370/394 |
| 2002/0178310 A1 * | 11/2002 | Nozaki | 710/240 |
| 2003/0208655 A1 * | 11/2003 | Lee et al. | 711/5 |
| 2006/0259660 A1 * | 11/2006 | Castille et al. | 710/36 |
| 2007/0296728 A1 * | 12/2007 | Aoki | 345/531 |

FOREIGN PATENT DOCUMENTS

| | | | |
|---|---|---|---|
| GB | 2352371 A | * | 1/2001 |
| WO | WO 2006085272 A2 | * | 8/2006 |

* cited by examiner

METHOD FOR MANAGING UNDER-RUNS AND A DEVICE HAVING UNDER-RUN MANAGEMENT CAPABILITIES

FIELD OF THE INVENTION

The invention relates to a devices and methods for managing under-runs.

BACKGROUND OF THE INVENTION

In today's telecommunications, digital networks transport large amounts of information. Network services can be, for example, traditional voice phone, facsimile, television, audio and video broadcast, and information transfer.

With the increasing need of information exchange in the global society, the capacity of existing and future networks must be used efficiently. Multiplexers switch different network services to a single network in such a way that every service is fully maintained and does not disturb other services.

In a typical communication integrated circuit many components are involved in the processing of information. Some of these components (such as but not limited to processors) also execute additional tasks. In addition, some components participate in the processing of information packets or information frames that arrive from many communication channels.

In order to bridge between the responses of the various components various memory units are used. These memory units usually include First In First Out (FIFO) memory units (also referred to as buffers).

Buffers can experience under-runs. An under-run occurs when the buffer does not include enough (or any) information. Thus, when another component reads the buffer the buffer does not provide valid information.

There is a need to provide efficient methods for managing under-runs as well as efficient devices having under-run management capabilities.

SUMMARY OF THE PRESENT INVENTION

A device having under-run management capabilities and method for managing under-runs, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
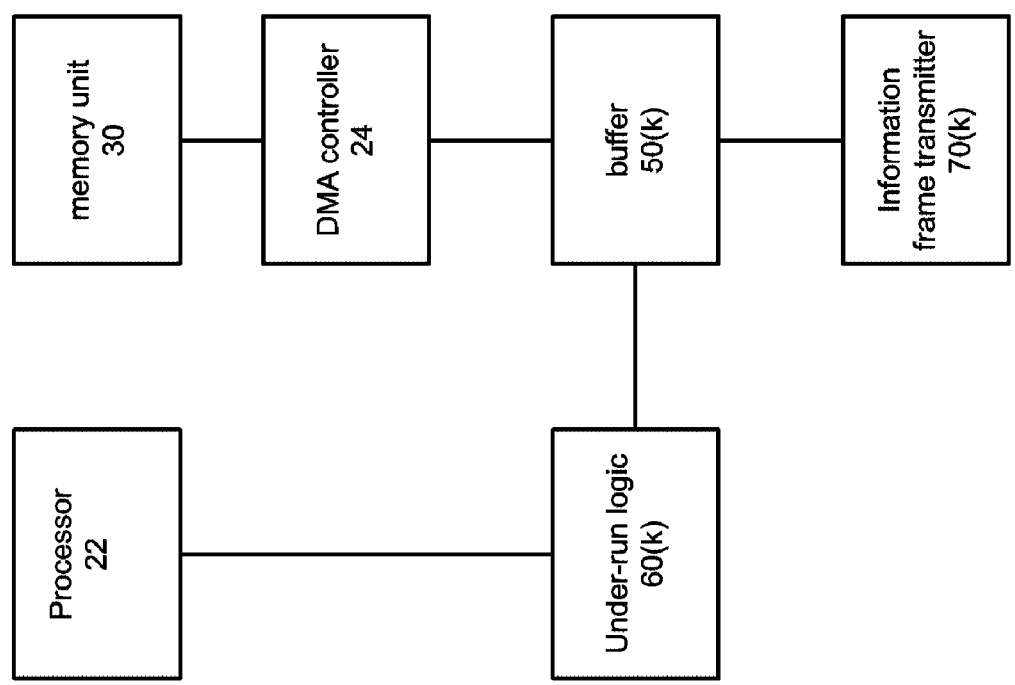
FIG. 1-FIG. 6 illustrate devices according to various embodiments of the invention.

The invention provides a device and a method for managing under-runs, especially in small buffers that are used to support high-speed transmissions.

According to an embodiment of the invention a device is provided. The device includes a processor, a memory unit, a direct memory access (DMA) controller, multiple information frame transmitters, multiple buffers and multiple under-run logics. The multiple buffers are connected to the multiple information frame transmitters and to the multiple under-run logics. Each buffer is adapted to store a fraction of a maximal sized information frame. Certain under-run logic out of the multiple under-run logics is connected to a certain buffer out of the multiple buffers, and to a certain information frame transmitter out of the multiple information frame transmitters. The certain under-run logic is adapted to: (i) detect an occurrence of a buffer under-run associated with a transmission attempt of a certain information frame from the certain buffer, (ii) instruct the certain frame transmitter to transmit predefined packets until a last packet of the certain information frame is retrieved from the certain buffer and (iii) send to the processor an under-run indication after at least one predefined packet was transmitted.

It is noted that one under-run logic can be associated with a single buffer and with a single information frame transmitter but this is not necessarily so. It is further noted that the device can include multiple processors, but this is not necessarily so.

According to an embodiment of the invention a method is provided. The method includes: (i) retrieving packets from multiple buffers, (ii) monitoring a state of a multiple buffers, (iii) determining whether an under-run associated with a transmission attempt of a certain information frame from a certain buffer occurs, and if an under-run occurs, (iv) requesting a certain information frame transmitter to transmit predefined packets while ignoring packets that are retrieved from the certain buffer, until a last packet of the information frame is retrieved from the certain buffer, thus discarding only the erroneous frame, and (v) notifying a processor that an under-run occurred after at least one predefined packet was transmitted. Conveniently, each buffer out of the multiple buffers is adapted to store a fraction of a maximal sized information frame.

The device and method enable to transmit high-speed information frames at a relatively effective manner. Many communication protocols, such as the modern versions of Ethernet frames can be very big. Jumbo frames can exceed 1000 bytes. When many large buffers are used to store such frames the die real estate that is required for storing large information frames can be very costly. This is especially true when the large buffers are required to operate at high speeds. This can make various buffer-based re-transmit solution ineffective.

Additionally or alternatively, interrupting a processor or performing a time-consuming restart operation whenever an under-run occurs can dramatically reduce the throughput of the communication device.

The suggested methods and device use multiple small buffers to store fractions of information frames, thus the overall die real estate consumed by the buffers is small. In addition, when an under-run occurs the device continues to operate, sends predefined packets (such as idle packets) and only notifies the processor that an under-run occurred making sure that only the erroneous frame is effected. The processor can initiate a re-transmission that can include providing to the buffer information packets that form an information frame. This re-transmission technique does not require complex buffer level re-transmission logic thus further reducing the overall dies real estate consumed by the device.

Conveniently, the methods and devices do not utilize large buffers that can other wise be mandated in devices and methods that perform buffer based retransmission or overall device reset. Conveniently, only the erroneous frame will be lost and device 30 will continue to work without external intervention.

Conveniently, the device operates at very high rates and can be an Ethernet compliant device.

FIG. 1 illustrates a device 10 according to an embodiment of the invention.

Device 10 includes a memory unit 30, a DMA controller 24, a buffer 50(*k*), an information frame transmitter 70(*k*), an under-run logic 60(*k*) and a processor 22. The DMA controller 24 is connected to the memory unit 30 and to the buffer 50(*k*). The buffer 50(*k*) is further connected to the under-run logic 60(*k*) and to the transmitter 70(*k*).

The memory unit 30 can store large information frames while the buffer 50(*k*) is much smaller. As illustrated in other figures, multiple buffers (50(1)-50(K)) can share a single memory unit 30. The DMA controller 24 is adapted to send information packets from the memory unit 30 to the buffer 50(*k*). The information packet transmitter 70(*k*) retrieves information packets from the buffer 50(*k*) and transmits them to another transmitter (such as a physically layer transmitter or another type of a lower layer transmitter), to a memory unit or to a communication line.

The under-run logic 60(*k*) is adapted to (i) detect an occurrence of a buffer under-run associated with a transmission attempt of a certain information frame from the buffer 50(*k*), (ii) instruct the information frame transmitter 70(*k*) to transmit predefined packets until a last packet of the certain information frame is retrieved from the buffer 50(*k*) and (iii) send to the processor 22 an under-run indication after at least one predefined packet was transmitted. It is noted that the last information packet is also ignored of and that the information frame transmitter transmits a predefined information packet instead of that last information packet, if an under run occurred.

Conveniently, the under-run indication is sent after the last information packet that belongs to that certain information frame is retrieved from buffer 50(*k*). The processor 22 can then instruct the DMA controller 24 to start sending data packets that belong to the information frame to buffer 50(*k*), according to the state of buffer 50(*k*). It is noted that the processor 22 can also decide not to perform this re-transmission sequence. Typically, multiple information packets (even more than ten) form an information frame, thus the re-transmission process can include multiple transferring iterations.

Figure 2:
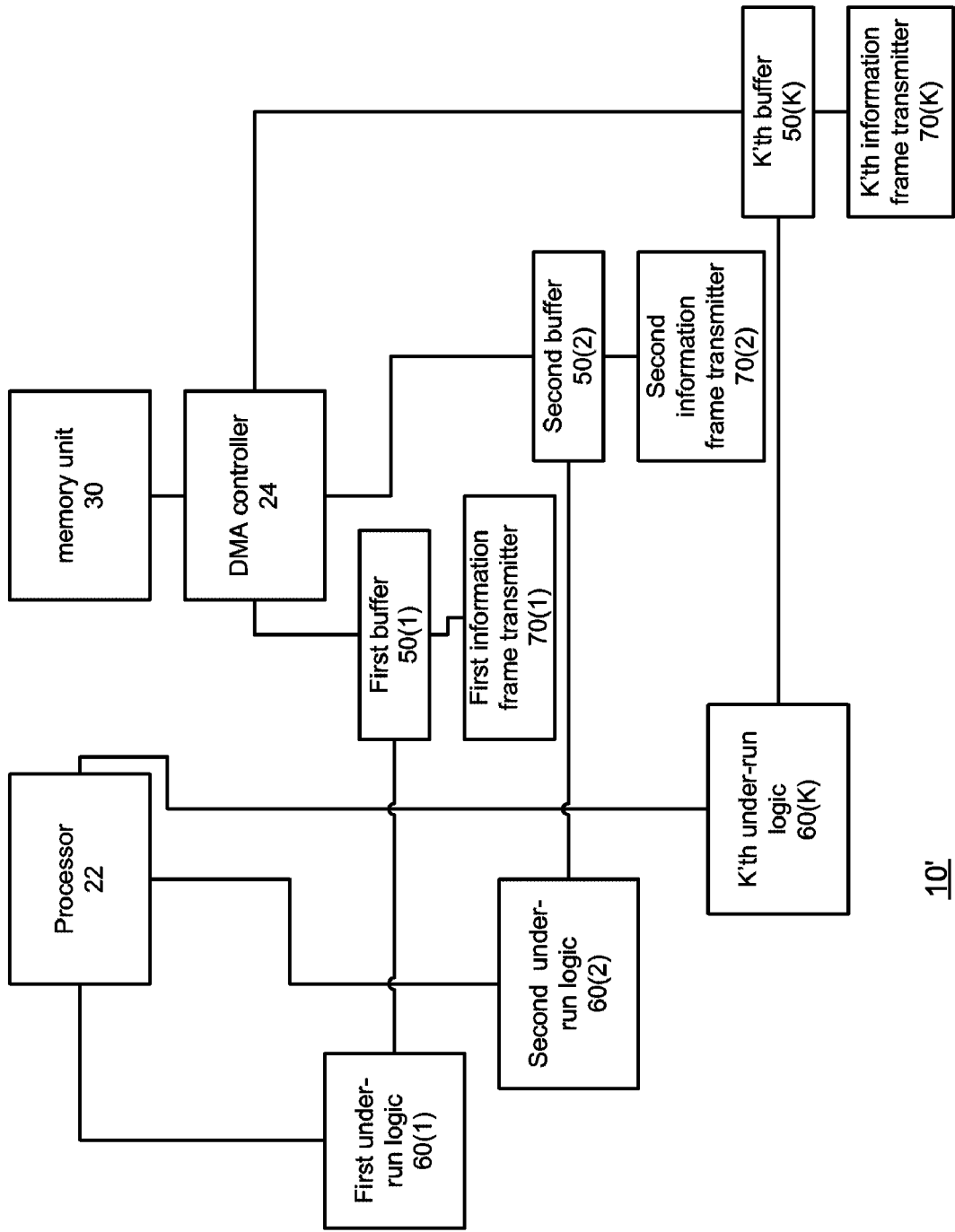

FIG. 2 illustrates a device 10', according to another embodiment of the invention. Device 10' of FIG. 2 differs from device 10 of FIG. 1 by including multiple (K) trios of under-run logics, buffers and information frame transmitters. It is assumed, for convenience of explanation that there are K under-run logics 60(1)-60(K), K buffers 50(1)-50(K) and K information frame transmitters 70(1)-70(K).

The k'th (k being an index that ranges between 1 and K) under-run logic 60(*k*) is connected to processor 22 and to the k'th buffer 50(*k*). The k'th buffer 50(*k*) is also connected to the k'th information frame transmitter 70(*k*).

Under-run logics 60(1)-60(K) can determine that up to K under-runs occur substantially concurrently, and send appropriate notifications to processor 22.

K can be greater than one, and can well exceed two. The inventors used eight trios of buffer, under-run logics and information frame transmitters and two processors. Four trios were connected to each processor. Other configurations can be used without departing from the spirit of the invention.

Figure 3:
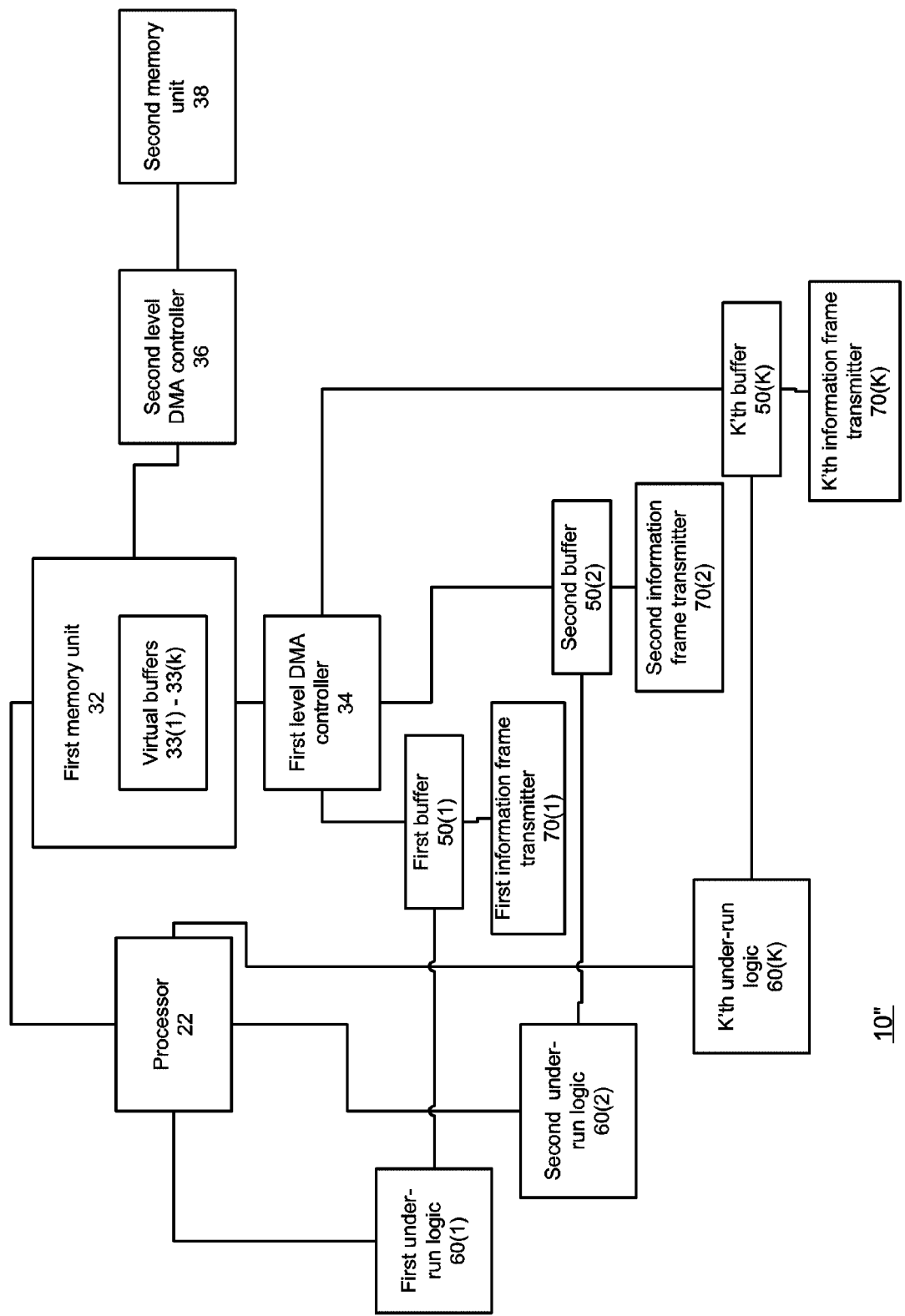

FIG. 3 illustrates a device 10", according to yet another embodiment of the invention. Device 10" of FIG. 3 differs from device 10' of FIG. 2 by including a second memory unit 38 and a first memory unit 32 adapted to maintain multiple virtual buffers 33(1)-33(K), instead of memory unit 30. Memory unit 30 can include both memory units 38 and 32, but this is not necessarily so. In addition, device 10" includes first level DMA controller 34 and a second level DMA controller 36. The second level DMA controller 36 sends information packets from the second memory unit 38 to the virtual buffers 33(1)-33(K) maintained in the first memory unit 32, while the first level DMA controller 34 sends information packets from the virtual buffers 33(1)-33(K) to corresponding buffers 50(1)-50( )K). It is noted that the size of information packets transferred per DMA transfer operation can differ from the first DMA controller to the second level DMA controller 36.

Conveniently, buffers 50(1)-50(K) are hardware FIFO memory units.

Figure 4:
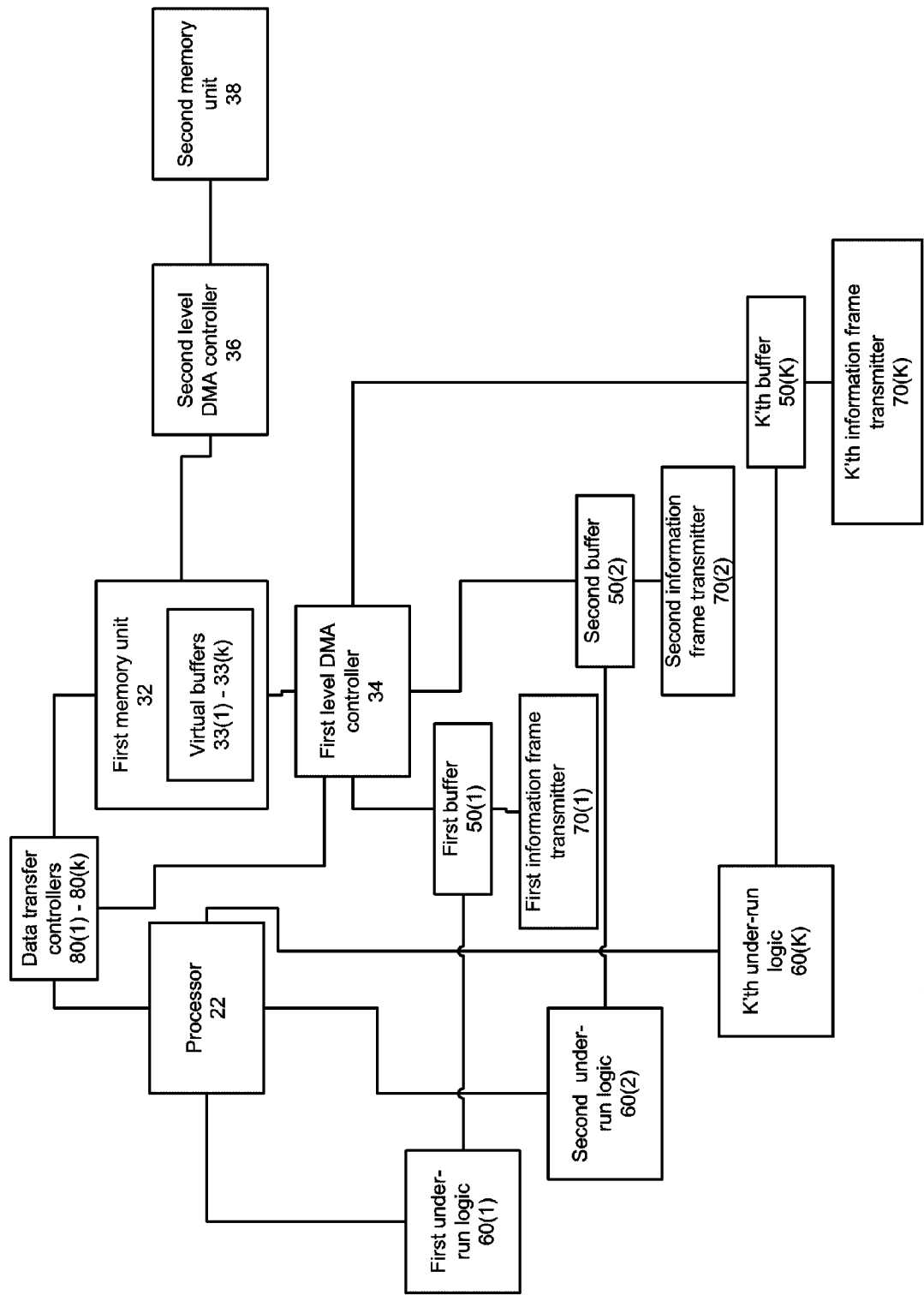

FIG. 4 illustrates a device 10''', according to yet another embodiment of the invention. Device 10''' of FIG. 4 differs from device 10" of FIG. 3 by including multiple data transfer controllers 80(1)-80(K) that control information transfers to the virtual buffers 33(1)-33(K) and from the virtual buffers, thus off-loading processor 22.

Figure 5:
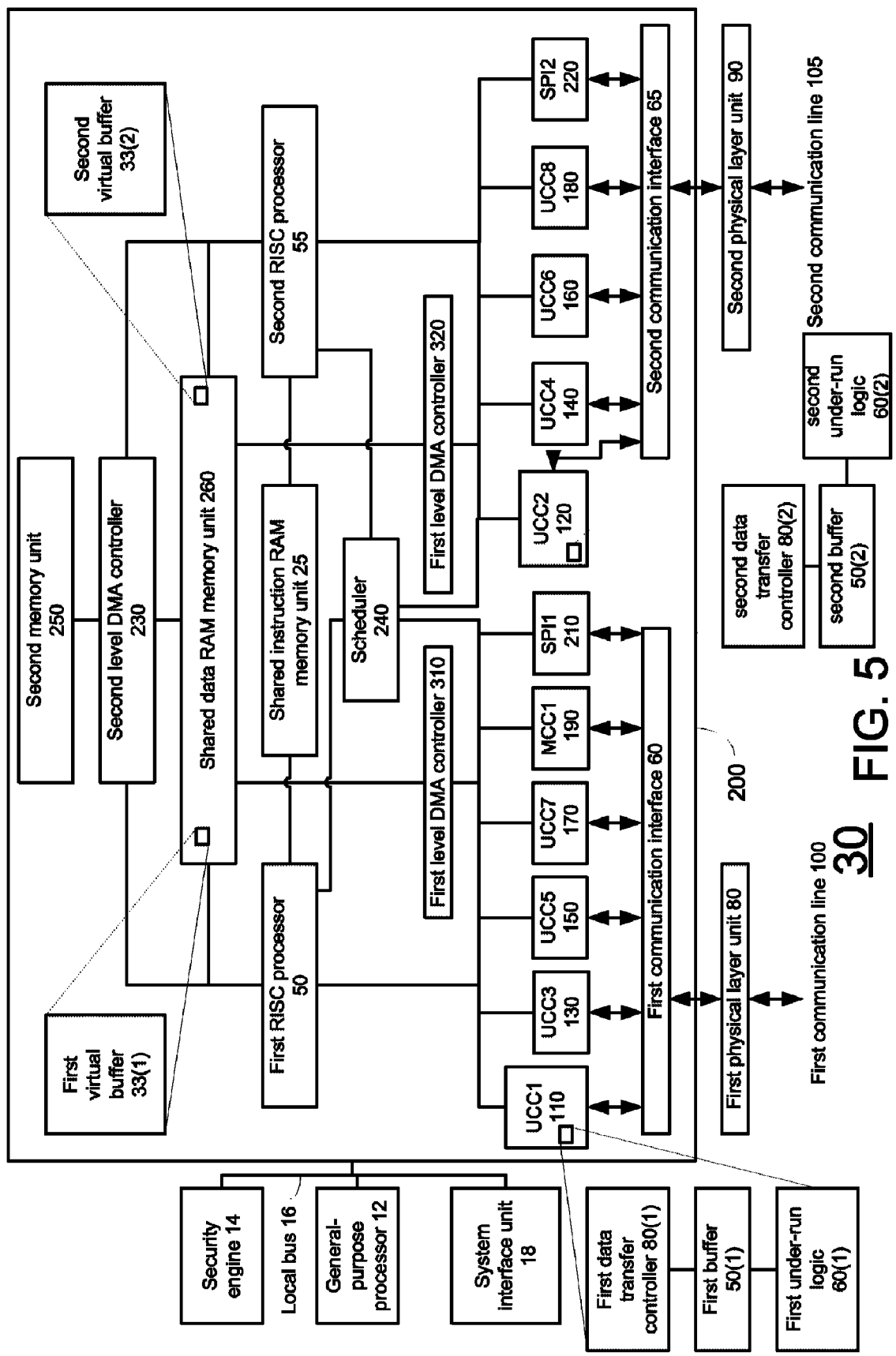

FIG. 5 illustrates a device 30, according to an embodiment of the invention.

Device 30 includes a general-purpose processor 12, a security engine 14, system interface unit 18, communication engine 200 and multiple ports (not shown). Components 12, 14, 18 and 200 are connected to each other by local bus 16.

The general-purpose processor 12 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 12 controls device 30 and can execute various programs according to the required functionality of device 30. The general-purpose processor 12 can be a member of the PowerPC™ family but this is not necessarily so.

The security engine 14 can apply various security mechanisms including encryption based mechanisms and the like.

Device 30 can be connected to multiple memory units as well as other components. These components are interfaced by system interface unit 18. System interface unit 18 may include some of the following components: external memory controllers, external DDR interface unit, PCI bridge, local bus, bus arbitrator, dual UART unit, dual I²C unit, a four channel DMA controller, an interrupt controller, and the like. It is noted that other interfacing components can be used.

Communication engine 200 is a versatile communication component that can manage multiple communication ports that operate according to different communication protocols.

According to an embodiment of the invention multiple hardware Buffers share the same first memory unit. This first memory unit usually stores at least one virtual Buffer per hardware Buffer.

Communication engine 200 includes multiple communication controllers of different types. Each communication controller can manage one or more communication channels. Conveniently, each communication channel is associated with a single virtual buffer. A bi-directional communication channel is viewed as a combination of a receive communication channel and a transmit communication channel. Each such communication channel can have its own information transfer controller, virtual buffers, hardware Buffer, and the like.

It is noted that one or more communication channels can be controlled by a single information transfer controller, but this is not necessarily so.

The communication engine 200 includes two RISC processors 50 and 55, second level DMA controller 230, a shared data RAM memory unit 260, a shared instruction RAM memory unit 25, scheduler 240, two first level DMA controllers 310 and 320, a second memory unit 250, eight universal communication controllers denoted UCC1-UCC8 110-180, one multi-channel communication controller (MCC1) 190, two serial peripheral interfaces denoted SP1-SP2 210-220, and two communication interfaces 60 and 65. It is noted that additional components, such as but not limited to various ports, time slots assigners and the like were omitted for simplicity of explanation.

The first RISC processor 50 is connected to UCC1 110, UCC3 130, UCC5 150, UCC7 170, MCC1 190, SPI1 210, scheduler 240, shared instruction RAM memory unit 25 and shared data RAM memory unit 260. The access to the first RISC controller can be managed by scheduler 240.

The second RISC processor 55 is connected to UCC2 120, UCC4 140, UCC6 160, UCC8 180, SPI2 220, scheduler 240, shared instruction RAM memory unit 25 and shared data RAM memory unit 260. The access to the first RISC controller can be managed by scheduler 240.

The first level DMA controllers 310 and 320 are connected to the shared data RAM memory unit 260 and to information transfer controllers (not shown) within the various communication controllers.

Each communication controller out of communication controllers UCC1-UCC8 110-180, MCC1 190, and SPI1-SPI2 210-220 can include transmission paths as well as reception paths.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC1 190 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinate the various components of the communication engine, as well as to enable the communication engine 200 to communicate with general-purpose processor 12, security engine 14 and system interface unit 18.

Conveniently, a group of communication controllers are connected to a single first level DMA controller, but this is not necessarily so. For example, first level DMA controller 310 serves communication controllers UCC1, UCC3, UCC5, UCC7, MCC1 and SPI1 110, 130, 150, 170, 190 and 210 respectively, while first level DMA controller 320 serves communication controllers UCC2, UCC4, UCC6, UCC8 and SPI2 120, 140, 160, 180 and 220 respectively.

According to an embodiment of the invention multiple communication controllers can use a single first memory unit that stores multiple virtual Buffers. This single first memory unit can be connected to multiple first level DMA controllers. For example, communication controllers 110-220 use different virtual buffers (such as virtual Buffers 33(1) and 33(2)), that are stored in shared data RAM memory unit 20.

Communication engine 200 can include multiple components that are analogues to the components of FIG. 1, FIG. 2, FIG. 3 or even FIG. 4. For convenience of explanation FIG. 5 illustrates second memory unit 250, second level DMA controller 230, two virtual buffers 33(1) and 33(2) within shared data RAM memory unit 260, two first level DMA controllers 310 and 320, two buffers 50(1) and 50(2), two data transfer controllers 80(1) and 80(2) and two under-run logics 60(1)

and 60(2). It is noted that other components, such as but not limited to UCC3-UCC8 130-130 can include buffers, and under-run logics.

First RISC processor 50 can receive under-run notification from any under-run logics within UCC1 110, UCC3 130, UCC5 150 and UCC7 170. Second RISC processor 55 can receive under-run notification from any under-run logics within UCC2 120, UCC4 140, UCC6 160 and UCC8 180. Each RISC processor can manage the under-run independently.

The information frame transmitters can include PHY layer transmitters included within first and second physical layer units 80 and 60, as well as MAC layer transmitters. The MAC layer transmitters form a part of each universal communication controller out of UCC1-UCC8 110-180. The first and second communication interfaces 60 and 65 can also be regarded as part of the information frame transmitters.

Figure 6:
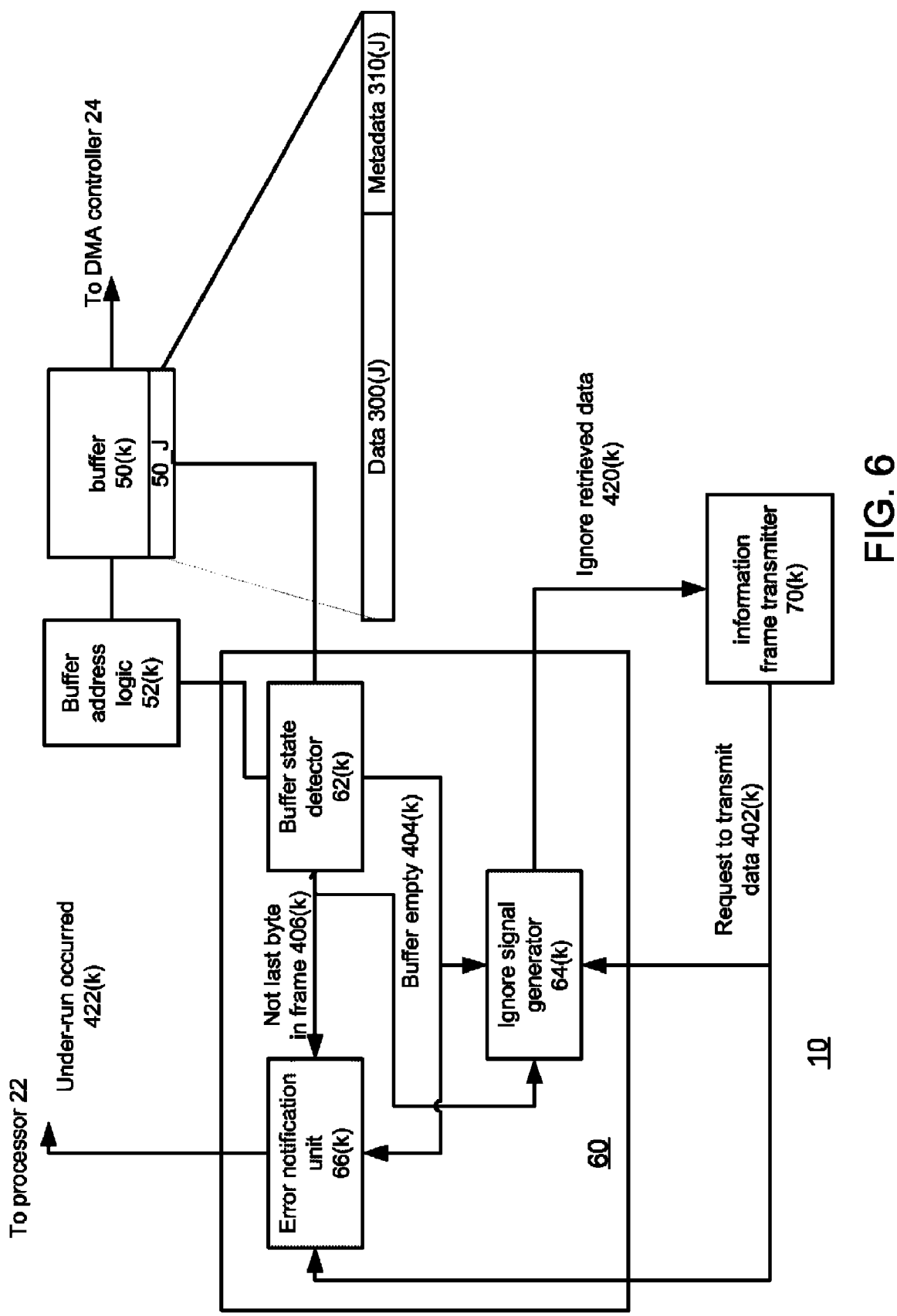

FIG. 6 illustrates device 10, according to an embodiment of the invention.

Under-run logic $60(k)$ includes a buffer state detector $62(k)$, an error notification unit $66(k)$ and an ignore signal generator $64(k)$. The buffer state detector $62(k)$ is connected to buffer address logic $52(k)$ and can determine that the buffer is empty (or at least its fullness level is below a predefined minimal threshold) by comparing the read and write pointers of buffer $50(k)$. If the buffer is empty the buffer state detector $62(k)$ sends a buffer empty signal $404(k)$. In addition, the buffer state detector $62(k)$ is also adapted to determine if the transmission of an information frame has ended. This can be implemented by associating metadata to each data packet, whereas the metadata indicates if the data packet is the first packet of the frame, the last packet in the frames and the like. It is illustrated by entry $50(k)\_J$ of buffer $50(k)$ that stores two fields—data 300(J) and an associated metadata field 310(J).

The buffer state detector $62(k)$ selectively outputs, through output $62(k,1)$ a buffer empty signal $404(k)$ as well as selectively outputs, through output $62(k,2)$ a not last byte in frame signal $406(k)$ to the error notification unit $66(k)$ and to the ignore signal generator $64(k)$. The ignore signal generator $64(k)$ sends an ignore retrieved signal $420(k)$ to information frame transmitter $70(k)$ if a buffer empty signal $404(k)$ is received, the information frame transmitter $70(k)$ expects to receive information from buffer $50(k)$ and if the transmission of the information frame did not end (as indicated by not last byte in frame signal $406(k)$ of FIG. 7).

In response to these signals the ignore signal generator $64(k)$ sends an ignore retrieved data signal 420 to the information frame transmitter $70(k)$ that in turn ignores data packets that are continuously retrieved from buffer $50(k)$. It is noted that the under-run logic $60(k)$ can provide the predefined packets to the information frame transmitter $70(k)$. In such a case the under-run logic can include a multiplexer or other setting or resetting components that generate the predefined frames.

Conveniently, the ignore signal generator $64(k)$ and the buffer state detector $62(k)$ can be integrated, or share various components.

Figure 7:
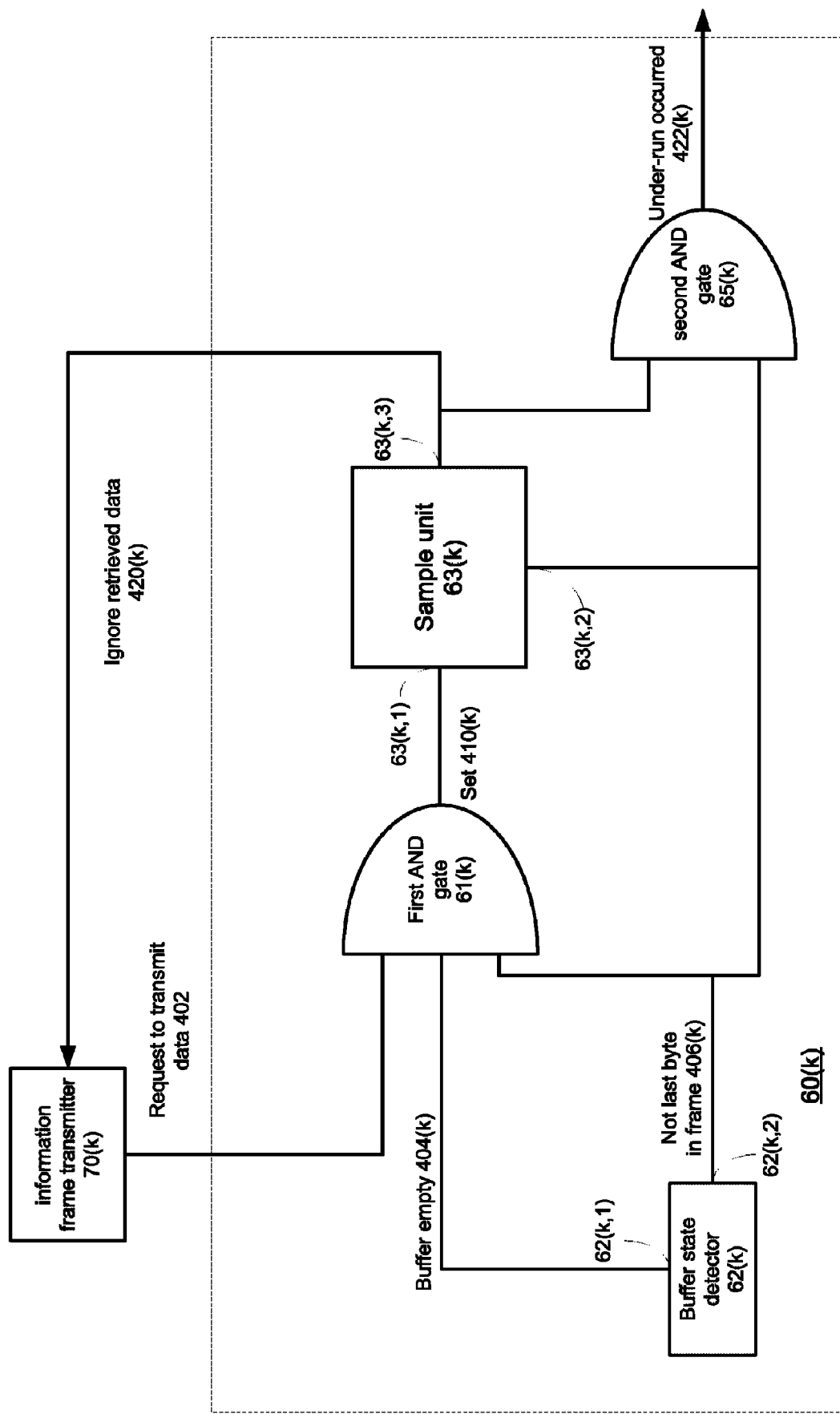
FIG. 7 illustrates an under-run logic according to an embodiment of the invention.

FIG. 7 illustrates under-run logic $60(k)$ according to an embodiment of the invention.

Under-run logic $60(k)$ includes a first AND gate $61(k)$, a second AND gate $65(k)$ and a sample unit $63(k)$. The first AND gate $61(k)$ has three inputs that are connected to the transmitter $70(k)$ and to outputs $62(k,1)$ and $62(k,2)$ of the buffer state detector $62(k)$. These inputs can receive a request to transmit data signal $402(k)$, a buffer empty signal $404(k)$ and a not last byte in frame $406(k)$. It is assumed, for convenience of explanation, that a signal is asserted to indicate that a certain condition (buffer emptiness, expectation to receive one or more data packets, transmission of an information frame was not completed) is fulfilled. Thus, if all three conditions are concurrently fulfilled then the first AND gate asserts a set signal 410(k) and sends this signal to set input 63(k,1) of the sample unit 63(k). The sample unit 63(k) can be a flip-flop.

The second input 63(k,2) also receives the not last byte in frame signal 406(k). This signal acts as a reset signal to sample unit 63(k). If the sample unit 63(k) is set then the sampling unit 63(k) outputs an asserted ignore retrieved data signal 420 to the information frame transmitter 70(k). The output 63(k,3) of the sample unit 63(k) and output 62(k,2) are also connected to the second AND gate 65. Thus, if an under-run was detected then after the last information packet is retrieved from the buffer 50(5) the processor 22 receives a under-run occurred signal 422(k).

Figure 8:
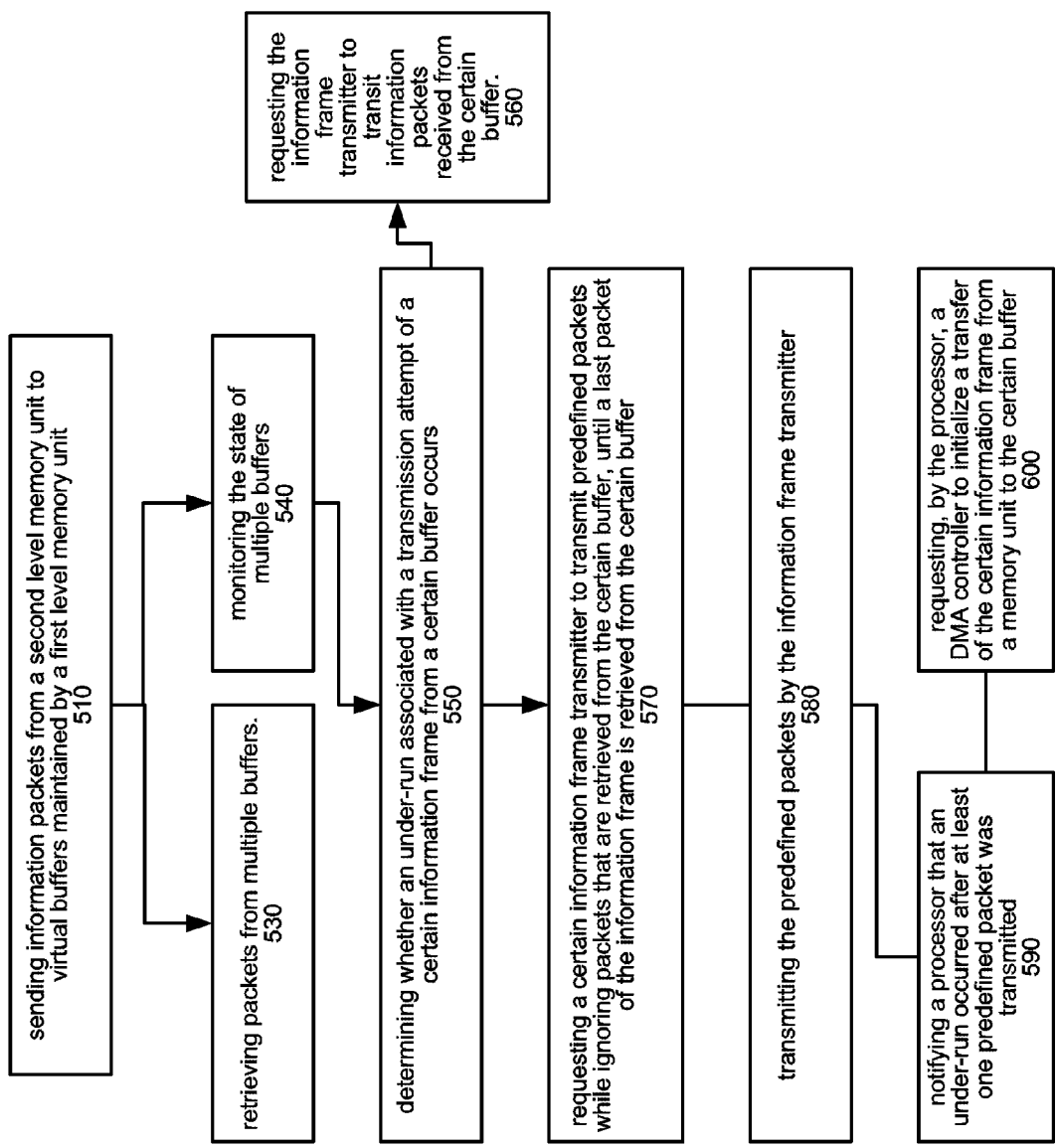
FIG. 8 is a flow chart of a method for managing under-runs, according to an embodiment of the invention.

FIG. 8 illustrates a flow chart of method 500, according to an embodiment of the invention.

Method 500 starts by optional stage 510 of sending information packets from a second level memory unit to virtual buffers maintained by a first level memory unit. Multiple transfers can occur concurrently. Each buffer is usually allocated to receive information packets that form a single information frame. Conveniently, stage 510 is repeated many times in order to transfer one information frame. It is noted that each transfer can include transferring fewer than ten percent of an information frame. It is further notes that multiple information packets that belong to multiple information frames can be transferred concurrently.

It is noted that the device can transmit information frame of various sized. While some frames can be relatively small others (such as maximal sized information frames) can be much longer. In Ethernet frames can be a few dozen bytes long but jumbo frames can exceed one thousand bytes.

Stage 510 is followed by stages 530 and 540. Stage 530 includes retrieving packets from multiple buffers. Stage 540 includes monitoring the state of multiple buffers. The information packets are retrieved from the buffer and sent to the information frame transmitter.

Stage 540 is followed by stage 550 of determining whether an under-run associated with a transmission attempt of a certain information frame from a certain buffer occurs. It is noted that multiple under-runs related to different buffers can occur substantially simultaneously. The method can manage each under-run event independently. Referring to the example set forth in FIG. 2 this certain buffer can be any buffer out of buffers 50(1)-50(K).

Conveniently, stage 550 of determining includes determining an occurrence of an under-run if the last packet that belongs to the certain information frame was not retrieved from the first buffer, if the certain frame transmitter expects to receive information from the first buffer and if a fullness level of the certain buffer reaches a predefined minimal level. This can be achieved by applying an AND operation on these conditions. It is noted that if multiple buffers are monitored then the determination is made for each buffer. When an under-run associated with a certain buffer is detected the other buffers can continue to operate independently of this detection.

If an under-run occurs, stage 550 is followed by stage 570 of requesting a certain information frame transmitter to transmit predefined packets while ignoring packets that are retrieved from the certain buffer, until a last packet of the information frame is retrieved from the certain buffer.

If no under-run is detected then stage 550 is followed by stage 560 of requesting the information frame transmitter to transmit information packets received from the certain buffer.

Conveniently, stage 570 is followed by stages 580 and 590.

Stage 580 includes transmitting the predefined packets by the information frame transmitter.

Conveniently, stage 580 of transmitting includes sending the predefined packets to lower layer transmitters and transmitting the information packets from the lower layer transmitters to communication lines.

Conveniently, stage 580 includes sending to the predefined packets to the information frame transmitter until a last packet of the information frame is retrieved from the certain buffer Conveniently, stage 580 of transmitting includes transmitting information frames at a very high transmission rate.

Stage 590 includes notifying a processor that an under-run occurred after at least one predefined packet was transmitted. It is noted that if the processor manages or otherwise is involved in the transmissions from multiple buffers then the indication should indicate the certain buffer that experienced the under-run.

Conveniently, the notifying occurs when a transmission of the certain information frame ends or after the end of the transmission of that certain information frame. The processor does not need to perform any buffer recovery stage, thus the time consuming reset procedure is not required.

Optionally, stage 590 is followed by stage 600 of requesting, by the processor, a DMA controller to initialize a transfer of the certain information frame from a memory unit to the certain buffer. The buffers are not able to store very large information frames, thus a re-transmission has to be initiated by the processor.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having under-run management capabilities, the device comprises: a processor; a memory unit; a direct memory access controller; multiple information frame transmitters; multiple buffers coupled to the multiple information frame transmitters and to multiple under-run logics; wherein each buffer is adapted to store a fraction of a maximal sized information frame; wherein a certain under-run logic out of the multiple under-run logics is coupled to a certain buffer out of the multiple buffers, and to a certain information frame transmitter out of the multiple information frame transmitters; and wherein the certain under-run logic is adapted to: (i) detect an occurrence of a buffer under-run associated with a transmission attempt of a certain information frame from the certain buffer, (ii) instruct the certain frame transmitter to transmit predefined packets until a last packet of the certain information frame is retrieved from the certain buffer and (iii) send to the processor an under-run indication after at least one predefined packet was transmitted; wherein the certain under-run logic is adapted to detect the occurrence of the buffer under-run if the last packet that belongs to the certain information frame was not retrieved from the certain buffer, if the certain frame transmitter expects to receive information from the certain buffer and if a buffer fullness level reaches a predefined minimal level.

2. The device according to claim 1 wherein the certain under-run logic is adapted to send an under-run indication to the processor when a transmission of the certain information frame ends or after an end of the transmission of that certain information frame.

3. The device according to claim 1 wherein the processor is adapted to instruct the direct memory access controller to initialize a transfer of the certain information frame from the memory unit to the certain buffer in response to a reception of the under-run indication.

4. A device having under-run management capabilities, the device comprises: a processor; a memory unit; a direct memory access controller; multiple information frame transmitters; multiple buffers coupled to the multiple information frame transmitters and to multiple under-run logics; wherein each buffer is adapted to store a fraction of a maximal sized information frame; wherein a certain under-run logic out of the multiple under-run logics is coupled to a certain buffer out of the multiple buffers, and to a certain information frame transmitter out of the multiple information frame transmitters; and wherein the certain under-run logic is adapted to: (i) detect an occurrence of a buffer under-run associated with a transmission attempt of a certain information frame from the certain buffer, (ii) instruct the certain frame transmitter to transmit predefined packets until a last packet of the certain information frame is retrieved from the certain buffer and (iii) send to the processor an under-run indication after at least one predefined packet was transmitted; wherein the memory unit comprises: a second level memory unit and a first level memory unit; wherein the direct memory access controller comprises a first level direct memory access controller and a second level direct memory access controller; wherein the first level memory unit is coupled to the first and second level direct memory access controllers; and wherein a transmission of the certain information frame comprises multiple information packet transfers from the second level memory unit to the first level memory unit and from the first level memory unit to the certain buffer.

5. The device according to claim 1 wherein each buffer out of the multiple buffers is coupled to one information frame transmitter out of the multiple information frame transmitters, and to one under-run logic out of the multiple under-run logics.

6. The device according to claim 1 wherein the multiple information frame transmitters are intermediate layer transmitters and wherein the multiple information frame transmitters are coupled to multiple communication lines via lower layer transmitters.

7. The device according to claim 1 wherein each buffer out of the multiple buffers can store less than ten percent of a maximal sized information frame.

8. The device according to claim 1 wherein the information frame transmitters are adapted to transmit information frames at a very high transmission rate.

9. The device according to claim 1 wherein the certain under-run logic is adapted to instruct the certain information frame transmitter to ignore information packets retrieved from the certain buffer.

10. A method for managing under-runs, the method comprises: retrieving packets from multiple buffers and monitoring a state of multiple buffers; determining whether an under-run associated with a transmission attempt of a certain information frame from a certain buffer occurs; if an under-run occurs, requesting a certain information frame transmitter to transmit predefined packets, until a last packet of the information frame is retrieved from the certain buffer; and notifying a processor that the under-run occurred after at least one predefined packet was transmitted; wherein each buffer out of the multiple buffers is adapted to store a fraction of a maximal sized information frame; wherein the determining comprises determining an occurrence of the under-run if the last packet that belongs to the certain information frame was not retrieved from the first buffer, if the certain frame transmitter expects to receive information from the first buffer and if a fullness level of the certain buffer reaches a predefined minimal level.

11. The method according to claim 10 wherein the stage of requesting is followed by transmitting the predefined packets by the information frame transmitter; and wherein the stage of notifying comprises notifying the processor when a transmission of the certain information frame ends or after the end of the transmission of that certain information frame.

12. The method according to claim 10 wherein the stage of notifying is followed by requesting, by the processor, a direct memory access controller to initialize a transfer of the certain information frame from a memory unit to the certain buffer.

13. A method for managing under-runs, the method comprises: retrieving packets from multiple buffers and monitoring a state of multiple buffers; determining whether an under-run associated with a transmission attempt of a certain information frame from a certain buffer occurs; if an under-run occurs, requesting a certain information frame transmitter to transmit predefined packets, until a last packet of the information frame is retrieved from the certain buffer; and notifying a processor that the under-run occurred after at least one predefined packet was transmitted; wherein each buffer out of the multiple buffers is adapted to store a fraction of a maximal sized information frame; wherein the retrieving is preceded by sending information packets from a second level memory unit to virtual buffers maintained by a first level memory unit.

14. The method according to claim 13 comprising sending information packets at least ten times in order to send a single information frame.

15. The method according to claim 10 wherein the transmitting comprises sending the predefined packets to lower layer transmitters and transmitting the information packets from the lower layer transmitters to communication lines.

16. The method according to claim 10 wherein the transmitting comprises transmitting information frames at a very high transmission rate.

17. The method according to claim 10 wherein the requesting further comprises requesting the certain information frame transmitter to ignore packets that are retrieved from the certain buffer.

18. The method according to claim 17 wherein the transmitting includes sending the predefined packets to the information frame transmitter.

* * * * *